000

(12) United States Patent
Otani

(10) Patent No.: US 9,690,228 B2
(45) Date of Patent: Jun. 27, 2017

(54) IMAGE PROCESSING APPARATUS, METHOD, AND STORAGE MEDIUM FOR MAINTAINING LINEARITY BETWEEN AN EXPOSURE INTENSITY AND DENSITY OF AN OUTPUT IMAGE

(71) Applicant: CANON KABUSHIKI KAISHA, Tokyo (JP)

(72) Inventor: Ryosuke Otani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/992,276

(22) Filed: Jan. 11, 2016

(65) Prior Publication Data

US 2016/0209773 A1    Jul. 21, 2016

(30) Foreign Application Priority Data

Jan. 21, 2015  (JP) ................. 2015-009530

(51) Int. Cl.
  *G03G 15/01*    (2006.01)
  *G03G 15/043*   (2006.01)
  *H04N 1/00*     (2006.01)

(52) U.S. Cl.
  CPC ............. *G03G 15/043* (2013.01); *H04N 1/00* (2013.01)

(58) Field of Classification Search
  None
  See application file for complete search history.

(56) References Cited

U.S. PATENT DOCUMENTS

| 6,486,973 B1 * | 11/2002 | Sasaki | ............... B41J 2/52 358/1.9 |
| 6,686,946 B2 * | 2/2004 | Masuda | ............ G06K 15/1247 347/236 |
| 8,098,405 B2 * | 1/2012 | Keithley | ............ H04N 1/40068 358/3.06 |
| 8,947,740 B1 * | 2/2015 | Wilsher | ............... H04N 1/0288 347/130 |

FOREIGN PATENT DOCUMENTS

JP    S61277258 A    12/1986

* cited by examiner

*Primary Examiner* — Paul F Payer
(74) *Attorney, Agent, or Firm* — Carter, DeLuca, Farrell & Schmidt, LLP

(57) ABSTRACT

An image processing apparatus that generates a halftone image to be used in a case where an image is formed on a printing medium by exposing a photoreceptor by intensity modulation of a light beam, having a multivalued dither processing unit configured to generate N-nary (N≥3) image from an input image by a dither method, a determination unit configured to determine whether a difference in pixel value between pixels adjacent to each other in an exposure scanning direction exceeds a predetermined limit value for each pixel of the N-nary image generated by the multivalued dither processing unit, and a correction unit configured to correct the pixel values of the adjacent pixels whose difference in pixel value has been determined to exceed the predetermined limit value so that the difference does not exceed the limit value.

9 Claims, 12 Drawing Sheets

| | SIGNAL DIFFERENCE DETERMINATION UNIT 910 | CORRECTION PROCESSING UNIT 920 |
|---|---|---|
| PROCESSING 1 | p1 p2<br>\| 15 \| 15 \| 4 \| 0 \| 0 \|<br>d = \|15-15\| = 0 | NONE TARGET OF CORRECTION |
| PROCESSING 2 | p1 p2<br>\| 15 \| 15 \| 4 \| 0 \| 0 \|<br>d = \|15-4\| = 11 | p1' p2'<br>\| 15 \| 13 \| 6 \| 0 \| 0 \|<br>p1' = round((15+4+7.5)/2) = 13<br>p2' = 15+4-13 = 6 |
| PROCESSING 3 | p1 p2<br>\| 15 \| 13 \| 6 \| 0 \| 0 \|<br>d = \|6-0\| = 6 | NONE TARGET OF CORRECTION |
| PROCESSING 4 | p1 p2<br>\| 15 \| 13 \| 6 \| 0 \| 0 \|<br>d = \|0-0\| = 0 | NONE TARGET OF CORRECTION |

DITHER MATRIX 1101

| 13 | 6 | 10 | 14 |
|----|---|----|----|
| 9  | 1 | 2  | 7  |
| 5  | 4 | 3  | 11 |
| 16 | 12| 8  | 15 |

FIG.11A

THRESHOLD VALUE MATRIX 1102

| | | \multicolumn{16}{c|}{PIXEL POSITION i} |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| DEMARCATION OF INTERVAL [j] | 15 | 30 | 135 | 71 | 88 | 96 | 127 | 144 | 175 | 184 | 221 | 200 | 243 | 222 | 231 | 244 | 254 |
| | 14 | 26 | 133 | 68 | 86 | 95 | 124 | 143 | 171 | 183 | 218 | 199 | 240 | 219 | 230 | 241 | 253 |
| | 13 | 23 | 131 | 65 | 84 | 94 | 121 | 142 | 168 | 182 | 215 | 198 | 237 | 216 | 229 | 238 | 252 |
| | 12 | 20 | 40 | 61 | 81 | 93 | 117 | 141 | 165 | 181 | 193 | 197 | 208 | 213 | 228 | 235 | 251 |
| | 11 | 17 | 38 | 58 | 79 | 92 | 114 | 140 | 162 | 180 | 190 | 196 | 206 | 212 | 226 | 234 | 250 |
| | 10 | 14 | 36 | 55 | 77 | 91 | 111 | 139 | 159 | 179 | 188 | 195 | 204 | 211 | 225 | 233 | 249 |
| | 9 | 11 | 34 | 52 | 75 | 90 | 108 | 138 | 156 | 178 | 186 | 194 | 202 | 210 | 224 | 232 | 248 |
| | 8 | 7 | 31 | 49 | 72 | 89 | 105 | 137 | 152 | 32 | 128 | 73 | 176 | 129 | 223 | 177 | 247 |
| | 7 | 6 | 28 | 48 | 69 | 87 | 104 | 134 | 151 | 29 | 125 | 70 | 173 | 126 | 220 | 174 | 246 |
| | 6 | 5 | 24 | 47 | 66 | 85 | 103 | 132 | 150 | 25 | 122 | 67 | 169 | 123 | 217 | 170 | 239 |
| | 5 | 4 | 21 | 46 | 62 | 83 | 102 | 130 | 149 | 22 | 119 | 63 | 166 | 120 | 214 | 167 | 236 |
| | 4 | 3 | 18 | 44 | 59 | 80 | 101 | 39 | 148 | 19 | 115 | 60 | 163 | 116 | 192 | 164 | 207 |
| | 3 | 2 | 15 | 43 | 56 | 78 | 99 | 37 | 147 | 16 | 112 | 57 | 160 | 113 | 189 | 161 | 205 |
| | 2 | 1 | 12 | 42 | 53 | 76 | 98 | 35 | 146 | 13 | 109 | 54 | 157 | 110 | 187 | 158 | 203 |
| | 1 | 0 | 8 | 41 | 50 | 74 | 97 | 33 | 145 | 10 | 106 | 51 | 153 | 107 | 185 | 155 | 201 |

FIG.11B

IMAGE PROCESSING APPARATUS, METHOD, AND STORAGE MEDIUM FOR MAINTAINING LINEARITY BETWEEN AN EXPOSURE INTENSITY AND DENSITY OF AN OUTPUT IMAGE

BACKGROUND OF THE INVENTION

Field of the Invention

The present invention relates to an image processing apparatus for forming an image by using an electrophotographic system.

Description of the Related Art

Conventionally, a so-called image forming apparatus of the electrophotographic system is known, such as a laser beam printer and a copying machine, which forms an electrostatic latent image by irradiating the surface of a photoreceptor with a light beam in accordance with an exposure signal and develops the electrostatic latent image by causing toner to stick thereto. Then, as the exposure system, an LED system is known. In the LED system, a plurality of LED elements, which are light-emitting elements, is arranged in the lengthwise direction of a photoreceptor drum and a plurality of lenses to collect light that is output from the LED elements onto the photoreceptor drum is also arranged.

There is a system for modulating light emission intensity (exposure intensity) of the light-emitting element (hereinafter, intensity modulation system) for improving gradation and resolution of an output image in the image forming apparatus of the electrophotographic system such as the above (see Japanese Patent Laid-Open No. S61-277258 (1986)).

However, in the case where a latent image is formed by the intensity modulation system, the increase or decrease in the toner-stuck area on the photoreceptor is not linear with respect to the exposure intensity and there is a case where an image deterioration, such as the collapse of the linearity of density of the output image, may occur. In order to maintain linearity, it is necessary to find an optimum amount of correction for each tone level, and therefore, there is such a problem that time and effort are necessary and throughput is reduced.

SUMMARY OF THE INVENTION

The image processing apparatus according to the present invention is an image processing apparatus that generates a halftone image to be used in a case where an image is formed on a printing medium by exposing a photoreceptor by intensity modulation of a light beam, and includes a multivalued dither processing unit configured to generate N-nary (N≥3) image from an input image by a dither method, a determination unit configured to determine whether a difference in pixel value between pixels adjacent to each other in an exposure scanning direction exceeds a predetermined limit value for each pixel of the N-nary image generated by the multivalued dither processing unit, and a correction unit configured to correct the pixel values of the adjacent pixels whose difference in pixel value has been determined to exceed the predetermined limit value so that the difference does not exceed the limit value.

Further features of the present invention will become apparent from the following description of exemplary embodiments (with reference to the attached drawings).

BRIEF DESCRIPTION OF THE DRAWINGS

FIG. 11A is an example of a dither matrix that is used in multivalued dither processing in the second embodiment and FIG. 11B is an example of a threshold value matrix corresponding to the dither matrix.

DESCRIPTION OF THE EMBODIMENTS

In the following, with reference to the attached drawings, the present invention is explained in detail based on preferred embodiments. Configurations shown in the following embodiments are merely exemplary and the present invention is not limited to the configurations shown schematically.

First Embodiment

[Image Forming Apparatus]

Figure 1:
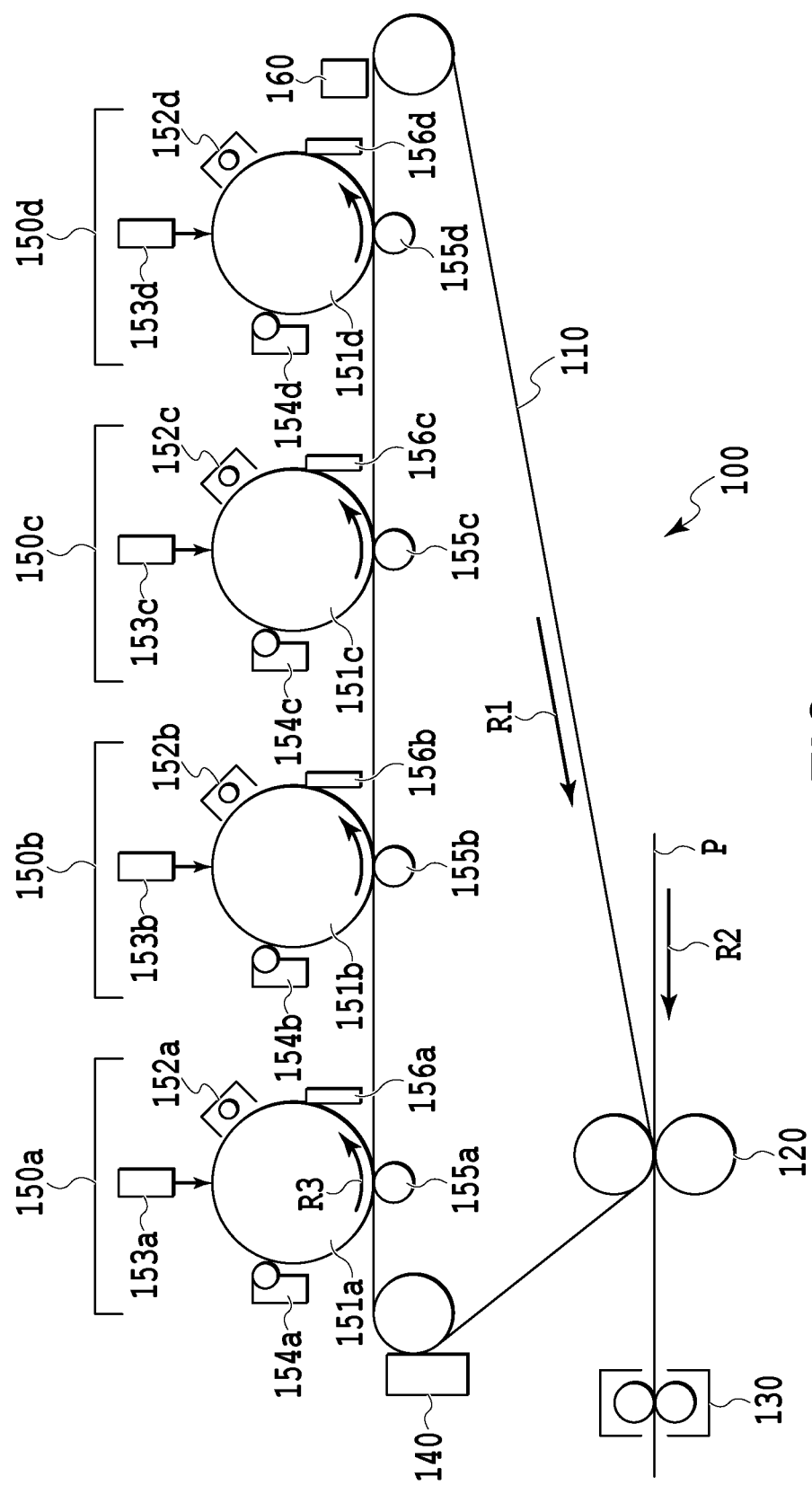
FIG. 1 a diagram showing an example of a configuration of an image forming apparatus of the electrophotographic system.

FIG. 1 is a diagram showing an example of a configuration of an image forming apparatus of the electrophotographic system according to the present embodiment.

An image forming apparatus 100 has four image forming units 150a to 150d, a density detection unit 160, a secondary transfer unit 120, and an intermediate transfer belt cleaning unit 140 along an intermediate transfer belt 110. Further, on the downstream side of the secondary transfer unit 120, a fixing unit 130 is arranged.

The image forming unit 150a has a photoreceptor drum 151a, a charge unit 152a, an exposure unit 153a, a development unit 154a, a primary transfer unit 155a, and a cleaning unit 156a. The other image forming units 150b, 150c, and 150d have the same components.

In the following, the operation of the image forming apparatus 100 is explained in detail.

First, image forming processing by the electrophotographic system that is performed by the image forming apparatus 100 is explained.

Each of the image forming units 150a to 150d forms a toner image on each of the photoreceptor drums 151a to 151d by using toner of each color and primarily transfers the toner image onto the intermediate transfer belt 110. The toner that is used in the image forming apparatus 100 generally has four colors: cyan (C), magenta (M), yellow (Y), and black (K). In the present embodiment, it is assumed that the image forming unit 150a uses K toner, the image forming unit 150b uses C toner, the image forming unit 150c uses M toner, and the image forming unit 150d uses Y toner. The number of image forming units and the colors of toner that are used are not limited to those of the above-described example. For example, the colors may include colors of a pale ink and a clear ink. Further, the order of the image forming units corresponding to each color is not limited to that in the present embodiment and may be arbitrary.

In the following, an outline flow of image forming processing is explained by taking the image forming unit 150a corresponding to the K toner as an example.

The photoreceptor drum 151a of the image forming unit 150a has an organic optical conductor layer whose charged polarity is the negative polarity on the outer circumferential surface and rotates in the direction of arrow R3.

(Charge)

The charge unit 152a charges the surface of the photoreceptor drum 151a to a uniform negative polarity potential by applying a negative polarity voltage and irradiating the surface of the photoreceptor drum 151a with charged particles.

(Exposure)

The exposure unit 153a irradiates the surface of the photoreceptor drum 151a with a light beam in accordance with the exposure signal and exposes the photoreceptor. In the present embodiment, the exposure unit 153a has an aspect capable of outputting exposure signals different in intensity. In other words, it is possible for the exposure unit 153a to change the intensity of the exposure signal in accordance with the tone level value in image data.

(Development)

The development unit 154a supplies toner charged to the negative polarity to the photoreceptor drum 151a on which an electrostatic latent image is formed by using a development roller that rotates at a substantially equal speed. The toner charged to the negative polarity sticks to the electrostatic latent image on the photoreceptor drum 151a in accordance with the development characteristics.

(Primary Transfer)

The primary transfer unit 155a primarily transfers the toner image charged to the negative polarity and carried on the photoreceptor drum 151a to the intermediate transfer belt 110 to which positive polarity changes are applied and which moves in the direction of arrow R1.

(Cleaning)

The cleaning unit 156a removes residual toner that has passed the primary transfer unit 155a and which is left on the photoreceptor drum 151a.

The above is an outline flow of the image forming processing in the image forming unit 150a. This flow also applies to the other image forming units 150b, 150c, and 150d. In the case where a color image is formed, each of the image forming units 150a to 150d for each color performs each process of charge, exposure, development, primary transfer, and cleaning described above at timing shifted by a predetermined time. As a result of this, on the intermediate transfer belt 110, an image in which toner images in four colors are superimposed is formed.

(Secondary Transfer)

The secondary transfer unit 120 secondarily transfers the toner image carried on the intermediate transfer belt 110 to a printing medium P that moves in the direction of arrow R2.

(Fixing)

The fixing unit 130 fixes the image by performing processing to apply pressure, processing to apply heat, etc., on the printing medium P onto which the toner image is secondarily transferred.

(Belt Cleaning)

The intermediate transfer belt cleaning unit 140 removes the residual toner that is left on the intermediate transfer belt 110 having passed the secondary transfer unit 120

By the above, the image formation by using the electrophotographic system in the image forming apparatus 100 is completed.

[LED+Lens Group]

Figure 2:
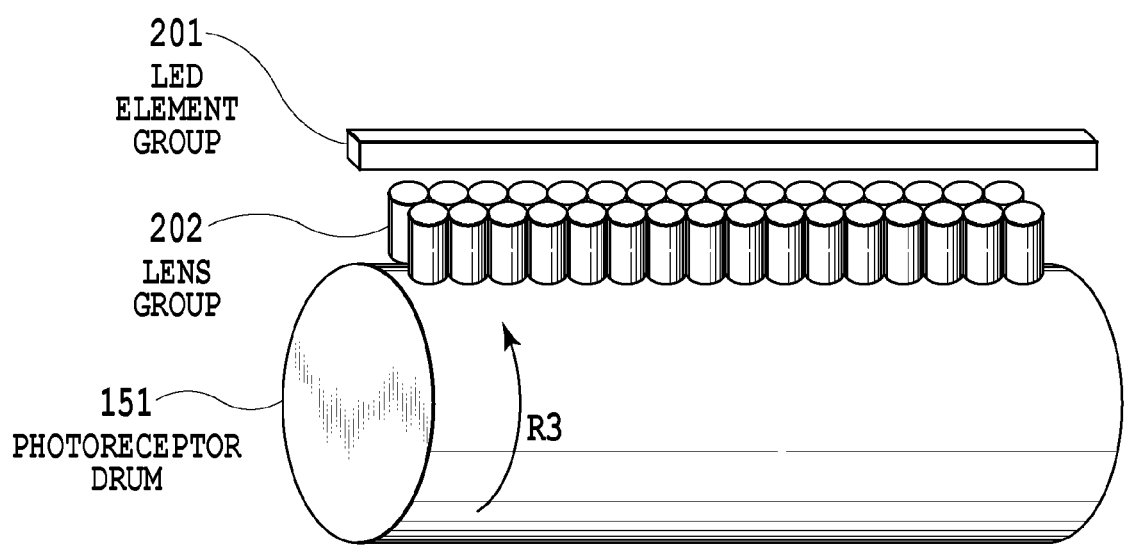
FIG. 2 is a diagram showing an example of a configuration of an exposure unit.
Figure 3A:
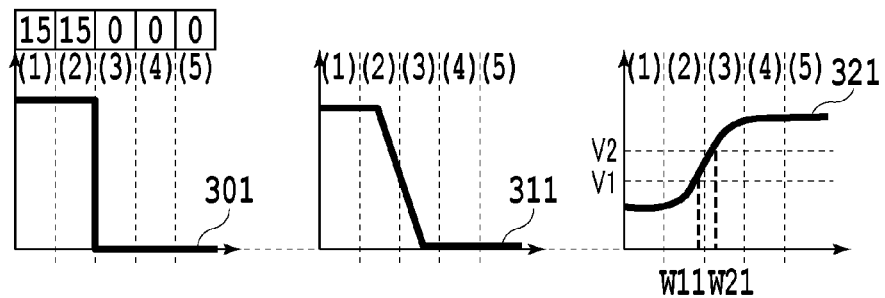
FIGS. 3A to 3E are diagrams explaining an outline of gradation representation by the intensity modulation system and an image quality deterioration that may occur in the case of the intensity modulation system.
Figure 3B:
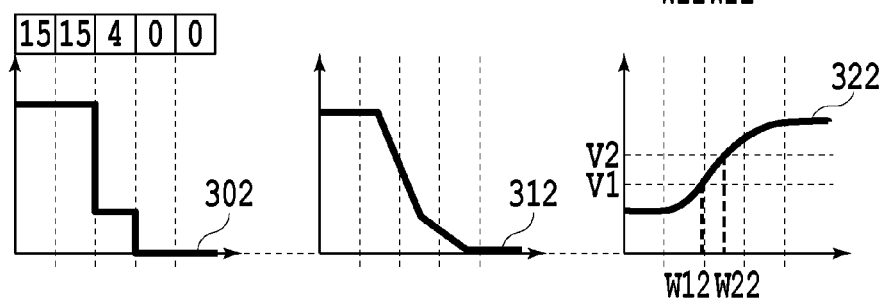
Figure 3C:
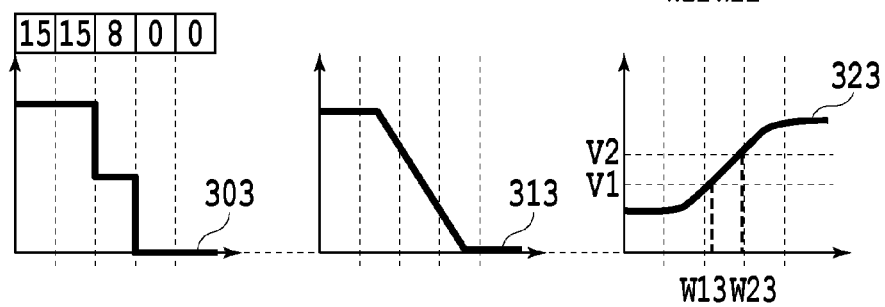
Figure 3D:
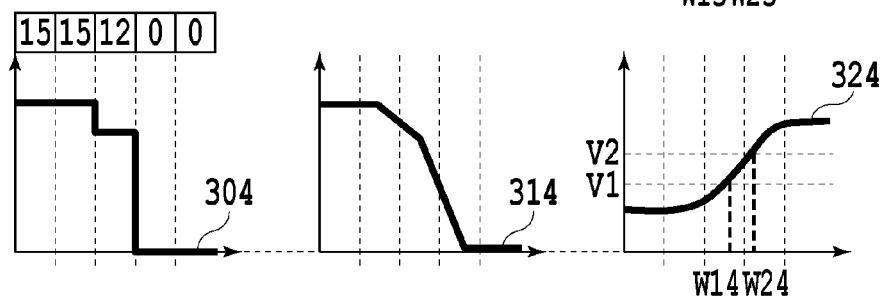
Figure 3E:
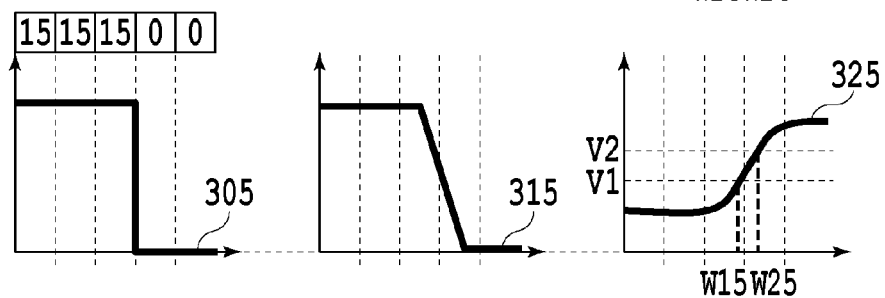

The image forming apparatus 100 of the present embodiment performs exposure processing by the LED system. FIG. 2 is a diagram showing an example of the configuration of an exposure unit 153. In FIG. 2, an LED element group 201 consists of a plurality of LED elements. A lens group 202 consists of a plurality of lenses. The output light from the LED element group 201 passes through the lens group 202 and forms an image on the photoreceptor drum 151a, and exposes and scans the photoreceptor in the R3 direction. In the present embodiment, the R3 direction in which the light-emitting element exposes and scans the surface of a photoreceptor drum 151 is referred to as an exposure scanning direction.

[Intensity Modulation System and its Problems]

The image forming apparatus 100 according to the present embodiment performs gradation representation by using the so-called intensity modulation system. In the following, the intensity modulation system is explained by taking a configuration in which the exposure intensity is modulated in 16 steps (0 to 15) as an example. As described previously, in the case where an image is formed by the intensity modulation system, the increase or decrease in the toner-stuck area on the photoreceptor drum 151 is not linear with respect to the exposure intensity and there is a case where an image deterioration, such as the collapse of the linearity of density of an output image, may occur. Further, there is a case where the toner that sticks onto the photoreceptor drum 151a is not stable and image quality may deteriorate.

FIGS. 3A to 3E are diagrams explaining an outline of gradation representation by the intensity modulation system and image quality deteriorations that may occur in the case of the intensity modulation system. In each of FIGS. 3A to 3E, graphs each representing the exposure signal, the light quantity distribution due to exposure, and the potential of an electrostatic latent image (latent image potential) in the case where gradation representation is performed by the intensity modulation corresponding to one pixel are put side by side, and tone levels are different from one another in FIGS. 3A to 3E. The horizontal axis in each graph represents the position in the exposure scanning direction and the vertical axis represents the exposure intensity. Solid lines 301 to 305 each represent the exposure signal and the light emission intensity (exposure intensity) of the light-emitting element in each pixel is indicated by a numerical value above the solid line. A larger numerical value means a higher exposure intensity and the maximum value is "15". The numerical value of a pixel that is not caused to emit light is "0". In the case where exposure is performed based on the exposure signals 301 to 305, the surface of the photoreceptor drum 151a is exposed with light quantity distributions shown by solid lines 311 to 315. In other words, while the light beam passes the position on the photoreceptor corresponding to each pixel of the exposure signals 301 to 305, light is emitted with an intensity in accordance with the numerical value of each of the exposure signals 301 to 305 and the surface of the photoreceptor drum 151a is exposed and scanned. Then, on the surface of the photoreceptor drum 151a, an electrostatic latent image having a latent image potential as represented by each of solid lines 321 to 325 is formed in accordance with the light quantity distributions 311 to 315 with which exposure and scan are performed. After this, toner sticks in accordance with the electrostatic latent image on the surface of the photoreceptor drum 151a and the development potential of the development unit 154a in the development process. In other words, toner sticks to a position where the latent image potential on the surface of the photoreceptor drum 151a is lower than the development potential, and tone hardly sticks to a position where the latent image potential on the surface of the drum is higher than the development potential.

In the image forming apparatus 100 in which an image is formed as described above, it is known that the development potential fluctuates due to the change in the printing environment and in the process state. In the case where the development potential fluctuates, the rate of change at the boundary position to which toner sticks on the photoreceptor drum 151 fluctuates as a result in accordance with the input exposure signal. In the following, detailed explanation is given with reference to FIG. 3 and FIG. 4.

Figure 4:
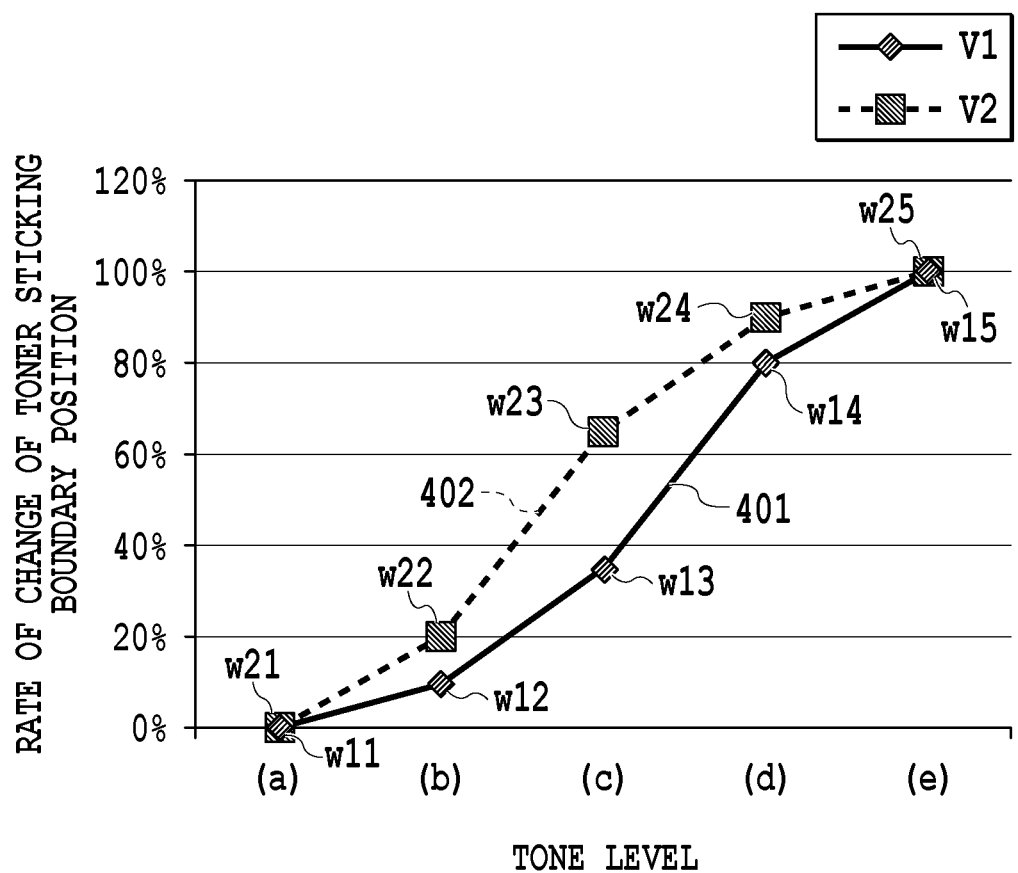
FIG. 4 is graphs each representing a rate of change of a toner sticking boundary position.
Figure 5:
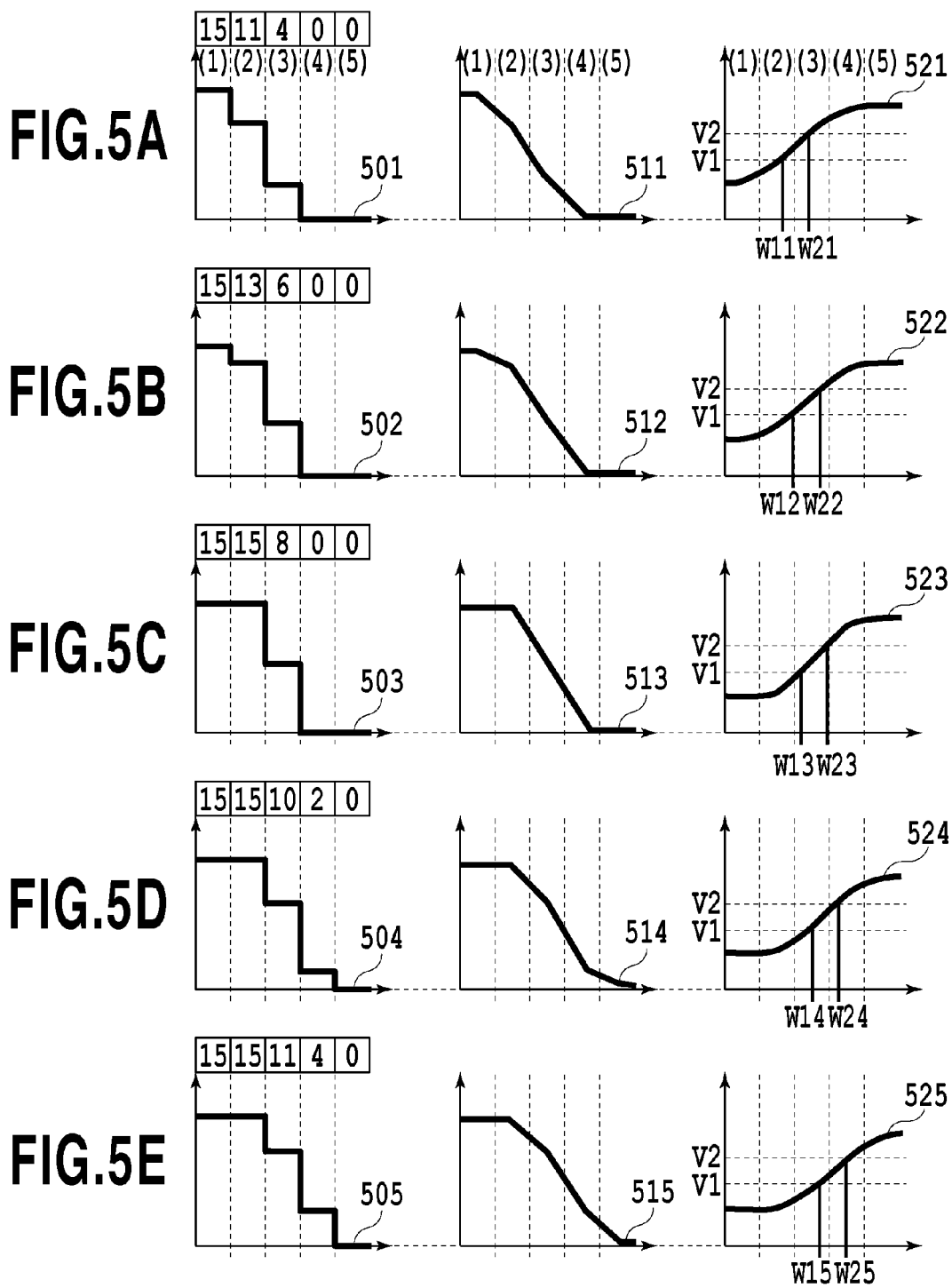
FIGS. 5A to 5E are diagrams explaining an outline of correction processing and its effects.

In FIG. 3, broken lines V1 and V2 in the horizontal direction represent fluctuations in the development potential. The, broken lines w11 to w15 and w21 to w25 represent the toner sticking boundary position on the photoreceptor drum 151 corresponding to the development potentials V1 and V2 at each tone level in FIGS. 3A to 3E. From each graph at the rightmost end in FIGS. 3A to 3E, it is known that the toner sticking boundary position differs depending on the development potential. In other words, in the case where the development potential is V1, the positions (toner sticking boundary positions) where the latent image potentials 321 to 325 on the surface of the photoreceptor drum 151 become lower than the development potential V1 are w11, w12, w13, w14, and w15, respectively. On the other hand, in the case where the development potential is V2, the positions where the latent image potentials 321 to 325 on the surface of the drum become lower than the development potential V2 are w21, w22, w23, w24, and w25, respectively. FIG. 4 is graphs representing the rates of change of the toner boundary position at each tone level in FIGS. 3A to 3E. Normalization is performed so that the rate of change at the toner sticking boundary position corresponding to the tone level in FIG. 3A is 0% and that at the toner sticking boundary position corresponding to the tone level in FIG. 3E is 100%. As is obvious from the graphs in FIG. 4, in the case where the development potential changes from V1 to V2, the rate of change at the toner sticking boundary position changes from a solid line 401 to a broken line 402 in FIG. 4. Because of this, for example, even in the case where a setting is performed so that the exposure intensity is linear with respect to the exposure signal in the state where the development potential is V1, on a condition that, for example, the development characteristics change to V2 due to the process condition or the like at the time of the printing operation, it is not possible to maintain the linearity of density in the output image, and therefore, the gradation does not stabilize. Further, in order to maintain the linearity, it is necessary to measure the optimum correction amount of density for each tone level, and therefore, there may occur such a problem that throughput is reduced because of outputting or the like of a density measurement chart and time and effort of a user are required accompanying the outputting.

An object of the present embodiment is to solve the problem such as described above that occurs in the image forming apparatus that performs gradation representation by using the intensity modulation system.

[Outline of Correction Processing]

Next, correction processing in the present embodiment is explained. FIGS. 5A to 5E are diagrams explaining an outline of the correction processing of the present embodiment and its effects based on the exposure signals at the respective tone levels shown in FIGS. 3A to 3E described previously. In the correction processing in the present embodiment, the slopes of latent image potential at the toner sticking boundary positions are controlled to be substantially the same by performing correction so that the difference (signal difference) in the value indicating the intensity in the exposure signal between pixels adjacent to each other does not exceed a limit value. In the present embodiment with a configuration in which the exposure intensity is modulated in 16 steps (0 to 15), for example, in the case where the limit value of the signal difference is taken to be "8", the value indicating the intensity of the exposure signal in FIGS. 3A to 3E is corrected so that the signal difference between the pixels adjacent to each other does not exceed "8", which is the limit value. For example, from a comparison between FIG. 3A and FIG. 5A, it is known that the signal difference between the pixels adjacent to each other is "15" at the maximum (signal difference between (2) and (3)) in FIG. 3A before the correction, but in FIG. 5A after the correction, the correction is performed so that the signal difference is "7" at the maximum (the limit value 8 is not exceeded). How to perform the correction processing actually will be described later. Then, in the case where the surface of the photoreceptor drum 151a is exposed by each light-emitting element of the exposure unit 153a based on the exposure signals after the correction, the distributions of light quantity with which the surface of the photoreceptor is exposed finally have substantially the same slope at each tone level in FIGS. 5A to 5E as indicated by solid lines 511 to 515. As a result of this, as indicated by solid lines 521 to 525, the electrostatic latent images on the photoreceptor drum 151a are also formed so that the slopes of the latent image potential at the toner sticking boundary positions become substantially the same.

Figure 6:
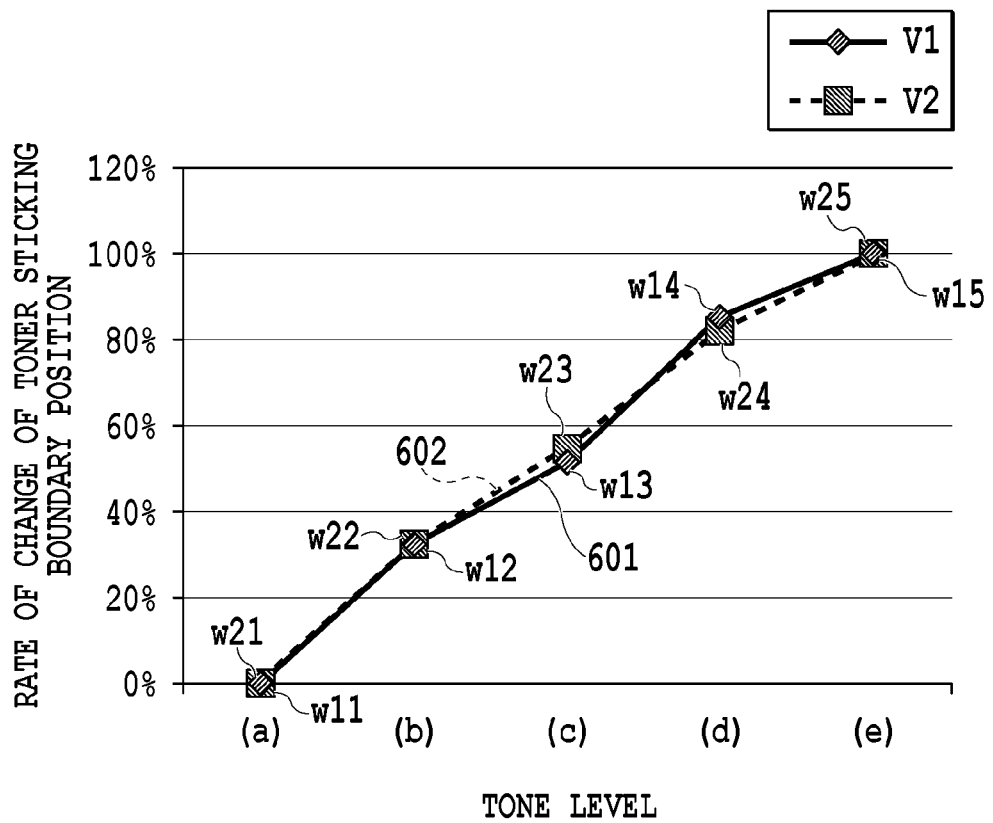
FIG. 6 is graphs representing the rate of change of the toner sticking boundary position.

In FIGS. 5A to 5E, the straight lines V1 and V2 in the horizontal direction indicate the fluctuations in the development potential as in FIGS. 3A to 3E. Then, the solid lines w11 to w15 and w21 to w25 in the vertical direction indicate the toner sticking boundary positions on the photoreceptor drum 151 corresponding to the development potentials V1 and V2 at each tone level in FIGS. 5A to 5E. FIG. 6 is graphs representing the changes of rate of the toner sticking boundary position at each tone level in FIGS. 5A to 5E. As in the graphs in FIG. 4 described previously, in the case where the development potential changes from V1 to V2, the rate of change of the toner sticking boundary position at each tone level changes from a solid line 601 to a broken line 602. From the graphs in FIG. 6, it is known that the rate of change in the case of the development potential V1 (w11→w12→w13→w14→w15) and the rate of change in the case of the development potential V2 (w21→w22→w23→w24→w25) are substantially the same and the rate of change of the toner sticking boundary position is stable regardless of the tone level. As described above, by correcting the exposure intensity so that the slope of the latent image potential becomes substantially constant in the vicinity of the toner sticking boundary position in the electrostatic latent image on the surface of the photoreceptor drum 151, it is made possible to keep stable the linearity of the density of the output image with respect to the input tone level value.

[Outline of Image Processing Apparatus]

Figure 7:
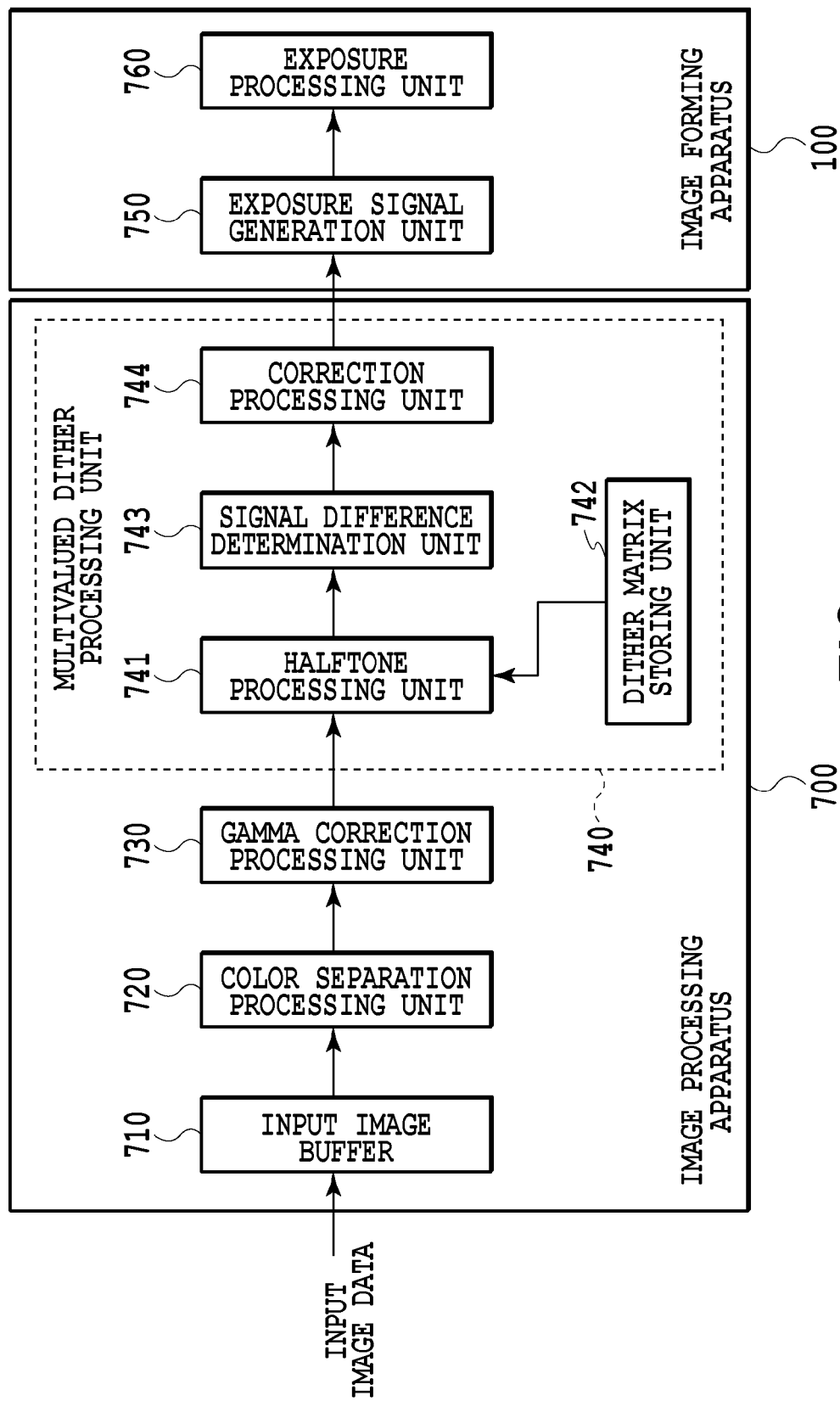
FIG. 7 is a diagram showing an example of a configuration of a printing system according to a first embodiment.

Next, an image processing apparatus that performs the correction processing of the exposure intensity described above is explained. FIG. 7 is a diagram showing an example of a configuration of the printing system according to the present embodiment. In the present embodiment, the configuration is such that the processing to convert input image data into image data (multi-gradation halftone image data) that can be output by the image forming apparatus 100 and the previous processing are performed by an image processing apparatus 700 and the processing to form an image on a printing medium by the electrophotographic system based on the image data is performed by the image forming apparatus 100. In this case, the image processing apparatus 700 and the image forming apparatus 100 are connected by an interface, such as wireless communication, or a circuit. It is possible to implement the image processing apparatus 700 by a printer driver that is installed in a common personal computer. In this case, each unit of the image processing apparatus 700, which will be explained in the following, is implemented by the computer executing a predetermined program. As another configuration, for example, a configuration in which the image forming apparatus 100 includes the image processing apparatus 700 may be accepted.

The image processing apparatus 700 according to the present embodiment includes an input image buffer 710, a color separation processing unit 720, a gamma correction processing unit 730, and a multivalued dither processing unit 740. Then, the multivalued dither processing unit internally includes a halftone processing unit 741, a dither matrix storing unit 742, a signal difference determination unit 743, and a correction processing unit 744. In the following, each processing unit of the image processing apparatus 700 is explained.

The input image buffer 710 is a buffer for storing multi-gradation image data (e.g., image data of each of 8-bit RGB) that is generated by various applications or the like or input from the outside. To the input image data, attribute information indicating the image type (attribute), such as a line drawing, a character image, and a photo, is attached. The input image data that is stored in the input image buffer 710 is sent to the color separation processing unit 720.

The color separation processing unit 720 converts the input image data in the RGB color space into image data in the CMYK color space corresponding to the colors of toner that the image forming apparatus 100 includes.

The gamma correction processing unit 730 performs gamma correction processing on the image data of each of CMYK colors that is generated by the color separation processing unit 720 by referring to the density correction table that is created and held in advance.

The multivalued dither processing unit 740 generates halftone image data with a smaller number of tone levels by the dither method from the image data with a large number of tone levels of each of CMYK colors on which the gamma correction processing has been performed. In other words, the multivalued dither processing unit 740 generates N-nary (N 3) image from an input image by a dither method. An outline of each unit constituting the multivalued dither processing unit 740 is as follows.

The halftone processing unit 741 reduces the number of tone levels of the pixel data by performing halftone processing on the image data of each of CMYK colors by using a multivalued dither matrix that is stored in the dither matrix storing unit 742. In general, it is not possible for the image forming apparatus 100 to represent so many tone levels and in many cases, only image data with a small number of tone levels, such as two tone levels, four tone levels, and sixteen tone levels, can be input to the image forming apparatus 100. Consequently, in order to make it possible for the image forming apparatus 100 capable of reproducing only a small number of tone levels to represent a stable halftone, the number of tone levels is reduced by the halftone processing. In the halftone processing here, the pixel value of the input image data is compared with a group of threshold values (less than the number of tone levels of the input image) associated with the pixel in the dither matrix corresponding to the input pixel, and an interval of the group of threshold values in which the pixel value of the input pixel is included is specified. By outputting the signal value that is associated with the specified interval, halftone image data (hereinafter, HT image data) whose number of tone levels is smaller than that of the input image data is created. The method of the halftone processing is required only to be capable of reducing the number of tone levels of the input image data, and is not limited to the method in the above-described example. In the present embodiment, the halftone processing is performed on the image data of each of CMYK colors on which the gamma correction has already been performed, and thereby, multi-gradation HT image data in which each pixel has 4-bit tone levels is generated. The generated HT image data is output to the signal difference determination unit 743. At this time, in the HT image data that is output, one line in the horizontal direction corresponds to the exposure scanning direction in the case where an image is formed.

The signal difference determination unit 743 determines whether a signal difference between a pixel of interest and a pixel adjacent to the pixel of interest in the exposure scanning direction is greater than a limit value of the signal difference that is set in advance in the HT image data of each of CMYK colors that is output from the halftone processing unit 741. In other words, the signal difference determination unit 743 determines whether a difference in pixel value between pixels adjacent to each other in an exposure scanning direction exceeds a predetermined limit value for each pixel of the N-nary image generated by the multivalued dither processing unit. The information on the pixel (hereinafter, excess-determined pixel) whose signal difference from the adjacent pixel has been determined to exceed the limit value is sent to the correction processing unit 744 along with the HT image data of each of CMYK colors.

The correction processing unit 744 performs the correction processing on the excess-determined pixel whose signal difference has been determined to exceed the limit value by the signal difference determination unit 743 and the adjacent pixel. In the present embodiment, the correction is performed so that the signal values of the excess-determined pixel and the adjacent pixel do not exceed the limit value of the signal difference. Consequently, it is possible to obtain favorable gradation in an image in which priority is given to gradation, such as a photo. However, the contrast between both pixels on which the correction processing is to be performed is reduced, and therefore, there is a possibility that resolution will be reduced. Because of this, for an image of kind in which priority is given to resolution, such as a line image and a character image, this correction processing is not appropriate, and therefore, it is preferable to exclude such an image from the target of correction. However, of course, it may also be possible to perform the processing on an image for which priority is given to gradation as printing quality by a user even though the image is a line image or a character image. Further, even in the case of an image, such as a photo, for which priority is given to gradation, on a condition that one or more exposed pixels (pixel whose exposure intensity is equal to or higher than a predetermined value, typically, a so-called fully-lit pixel) are in contact in the exposure scanning direction with whichever of the excess-determined pixel and the adjacent pixel has a smaller signal value, there is a possibility that half-tone dots that are adjacent to each other will be brought into contact (a white isolated dot disappears) by this correction processing, and therefore, it is preferable to exclude such an image area from the target of correction. Furthermore, also in the case where one or more exposed pixels are not in contact in the exposure scanning direction with whichever of the excess-determined pixel and the adjacent pixel has a grater value, there is a possibility that the contrast will be reduced by this correction processing and the toner will not stick, and therefore, it is preferable to exclude such an image from the target of correction.

Next, each processing unit of the image forming apparatus 100 is explained.

An exposure signal generation unit 750 generates an exposure signal based on the multi-gradation HT image data of each of CMYK colors that is received from the image processing apparatus 700 and on which the necessary correction processing has been performed.

An exposure processing unit 760 performs exposure processing based on the exposure signal that is generated by the exposure signal generation unit 750.

[Details of Multivalued Dither Processing Unit 740]

Figure 8:
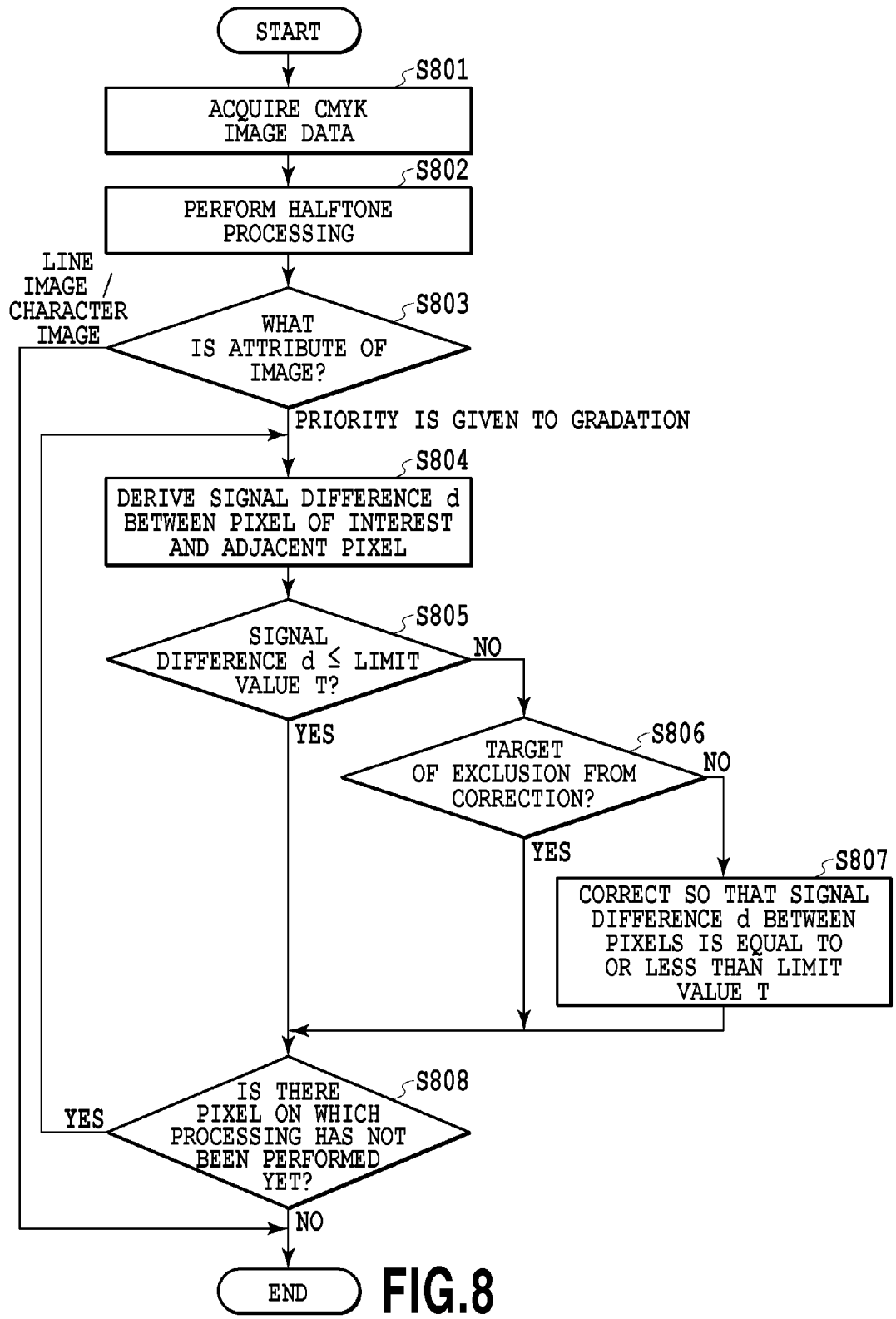
FIG. 8 is a flowchart showing a flow of processing in a multivalued dither processing unit.

Next, details of the processing in the above-described multivalued dither processing unit 740 are explained. FIG. 8 is a flowchart showing a flow of the processing in the multivalued dither processing unit 740. The series of the processing is performed by the CPU (not shown) executing a computer executable program in which the procedure shown below is described after reading the program from the ROM (not shown) onto the RAM (not shown).

At step 801, the multivalued dither processing unit 740 acquires image data of each of CMYK colors on which the gamma correction processing has been performed from the gamma correction processing unit 730. The acquired image data of each of CMYK colors is input to the halftone processing unit 741.

At step 802, the halftone processing unit 741 generates multivalued 4-bit HT image data by performing halftone processing on the image data of each of CMYK colors.

At step 803, the signal difference determination unit 743 determines the image type based on the attribute information that is attached to the input image data as the pre-processing of signal difference determination processing. In the case where the results of the determination indicate that the image type is an image in which priority is given to resolution, such as a line image and a character image, the correction is not necessary, and therefore, the present processing is exited. On the other hand, in the case where the image type is an image in which priority is given to gradation, such as a photo, the processing proceeds to step 804.

At step 804, the signal difference determination unit 743 determines a pixel of interest within the HT image data of each color and derives a signal difference d between the determined pixel of interest and a pixel adjacent to the pixel of interest in the exposure scanning direction.

At step 805, the signal difference determination unit 743 determines whether the signal difference d between the pixel of interest and the adjacent pixel, which is derived at step 804, is equal to or less than a predetermined limit value (threshold value) T. Here, as the limit value T, for example, the value of a signal value is set, at which the intensity is substantially half the maximum intensity that is modulated by the exposure unit 153. In the present embodiment, the maximum signal is "15", and therefore, in the case where the intensity substantially half the maximum intensity is set, the limit value T is set to "8 (=round (15/2))". Here, "round" is a function that rounds off to the nearest whole number. In the case where the derived signal difference d is equal to or less than the limit value T, the processing proceeds to step 808 without performing the correction processing. On the other hand, in the case where the derived signal difference d is greater than the limit value T, the pixel of interest is determined to be the excess-determined pixel and the processing proceeds to step 806.

At step 806, the signal difference determination unit 743 determines whether the pixel of interest determined to be the excess-determined pixel and the adjacent pixel are the targets of exclusion from the correction processing. Specifically, whether two conditions below are met is determined.

Condition 1: One or more exposed pixels are in contact in the exposure scanning direction with whichever of the excess-determined pixel and the adjacent pixel has a smaller exposure signal value.

Condition 2: One or more exposed pixels are not in contact in the exposure scanning direction with whichever of the excess-determined pixel and the adjacent pixel has a greater exposure signal value.

In the case where one of the above-described conditions is met, the pixel of interest determined to be the excess-determined pixel and the adjacent pixel are excluded from the target of correction processing, and therefore, the processing proceeds to step 808. On the other hand, in the case where none of the above-described conditions is met, the processing proceeds to step 807 and then the correction processing is performed.

At step 807, the correction processing unit 744 corrects the values of the exposure signals of both pixels so that the signal difference d between the pixel of interest determined to be the excess-determined pixel and the adjacent pixel becomes equal to or less than the limit value T. In this case, it is desirable that correction be performed so that the signal difference d becomes substantially equal to the limit value T.

At step 808, the multivalued dither processing unit 740 determines whether the processing has been completed for all the pixels of the HT image data. In the case where there is a pixel on which the processing has not been performed yet, the processing returns to step 804, and the next pixel (e.g., the pixel that has been the adjacent pixel in the previous processing) is taken to be a new pixel of interest and the processing is continued. On the other hand, in the case where the processing has been completed for all the pixels, the present processing is terminated.

The above is the contents of the processing in the multivalued dither processing unit 740.

[Specific Example of Correction Processing]

Figures 9A, 9B:
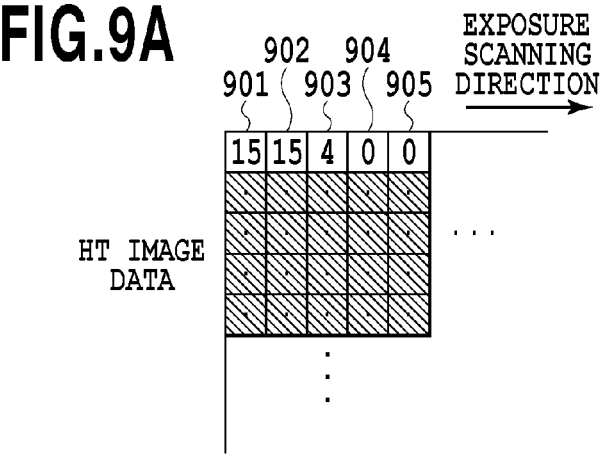
FIGS. 9A and 9B are diagrams showing a specific example of the correction processing.

FIG. 9 is a diagram showing a specific example of the correction processing in the correction processing unit 744 according to the present embodiment. In the correction processing according to the present embodiment, the correction processing is performed on the exposure signals in the exposure scanning direction, and therefore, explanation is given here by taking the correction processing for the exposure signals of five pixels 901 to 905 put side by side in the exposure scanning direction as an example. FIG. 9A shows HT image data before the start of the correction processing and the density values of the exposure signals of the pixels 901 to 905 are "15", "15", "4", "0", and "0", respectively. FIG. 9B shows results of moving the pixel of interest on the time series in the order of processing 1 to processing 4 for the exposure signals shown in FIG. 9A, and shows the results of the processing in the signal difference determination unit 743 in a column 910 and shows the results of the processing in the correction processing unit 744 in a column 920.

First, in the "processing 1", the pixel 901 is a pixel of interest p1 and the pixel 902 that is adjacent to the pixel 901 in the exposure scanning direction is an adjacent pixel p2. In this case, in the signal difference determination unit 743, the signal difference d between the pixel 901 and the pixel 902 is derived and the results of the processing is "d=0". Then, whether the derived signal difference d is equal to or less than the limit value T (here, "8") is determined. Here, the signal difference d (=0) is equal to or less than the limit value T, and therefore, the correction processing in the correction processing unit 744 is not performed as shown in the column 920.

Next, in the "processing 2", the pixel of interest is updated and the pixel 902 is the pixel of interest p1 and the pixel 903 is the adjacent pixel p2. In this case, in the signal difference determination unit 743, the signal difference d between the pixel 902 and the pixel 903 is derived and the results of the processing is "d=11". Then, whether the derived signal difference d is equal to or less than the limit value T is determined. Here, the signal difference d (=11) is greater than the limit value T (=8), and therefore, the pixel 902, which is the pixel of interest p1, is determined to be the excess-determined pixel. Then, whether the pixel 902, which is the excess-determined pixel, and the pixel 903, which is the pixel adjacent to the pixel 902, are the targets of exclusion is determined based on the two conditions described above. Here, the pixel 902 (pixel p1) whose signal value is greater is adjacent to the pixel 901 (exposed pixel whose signal value=15) and the pixel 903 whose signal value is smaller is adjacent to the pixel 904 (unexposed pixel whose signal value=0). Because of this, neither the pixel 902, which is the excess-determined pixel, nor the pixel 903, which is the adjacent pixel, is the target of exclusion from the correction. Then, in the correction processing unit 744, signal values of a pixel of interest p1' and an adjacent pixel p2' after the correction are determined in accordance with expression (1) and expression (2) below.

In the case where p1>p2:

$$p1'=\text{round}((p1+p2+T)/2-0.5)$$

$$p2'=p1+p2-p1' \quad \text{expression (1), and}$$

in the case where p1<p2:

$$p1'=\text{round}((p1+p2-T)/2+0.5)$$

$$p2'=p1+p2-p1' \quad \text{expression (2).}$$

According to expression (1) and expression (2) described above, the signal value of the pixel whose signal value is greater is decreased and the signal value of the pixel whose signal value is smaller is increased by the amount about the same as the amount of decrease described above. As a result of this, it is possible to perform the correction so that the signal difference does not exceed the limit value T without changing the total quantity of exposure light. The calculation expression for determining the signal value is required only to be capable of setting the signal difference between the pixel of interest and the adjacent pixel to be smaller than the limit value, and is not limited to expression (1) and expression (2) described above.

Next, in the "processing 3", the pixel of the interest is further updated and the pixel 903 is the pixel of interest p1 and the pixel 904 that is adjacent to the pixel 903 in the exposure scanning direction is the adjacent pixel p2. Then, in the signal difference determination unit 743, the signal difference d between the pixel 903 and the pixel 904 is derived and the results of the processing is "d=6". Then, whether the derived signal difference d is equal to or less than the limit value T is determined. Here, the signal difference d (=6) is equal to or less than the limit value T, and therefore, as shown in the column 920, the correction processing in the correction processing unit 744 is not performed.

Further, in the "processing 4", the pixel of the interest is further updated and the pixel 904 is the pixel of interest p1 and the pixel 905 that is adjacent to the pixel 904 in the exposure scanning direction is the adjacent pixel p2. Then, in the signal difference determination unit 743, the signal difference d between the pixel 904 and the pixel 905 is derived and the results of the processing is "d=0". Then, whether the derived signal difference d is equal to or less than the limit value T is determined. The signal difference d (=0) is equal to or less than the limit value T, and therefore, as shown in the column 920, the correction processing in the correction processing unit 744 is not performed.

By repeatedly performing the above-described processing, the necessary correction processing is performed on the HT image data. In the example of the exposure signals shown in FIG. 9A, no pixel is the target of exclusion from the correction, but in the case where the density values of the exposure signals of the pixels 901 to 905 are, for example, values as follows, each pixel is the target of exclusion from the correction.

<Density Values of the Pixels 901 to 905 in the Case where the Pixel is the Target of Exclusion from the Correction Based on the Condition 1>

(901: 15, 902: 15, 903: 0, 904: 15, 905: 15)<Density values of the pixels 901 to 905 in the case where the pixel is the target of exclusion from the correction based on the condition 2>

(901: 0, 902: 0, 903: 15, 904: 0, 905: 0)

Then, by excluding the pixel that meets the condition 1 from the target of the correction processing, it is possible to maintain a white isolated dot and by excluding the pixel that meets the condition 2 from the target of the correction processing, it is possible to maintain a black isolated dot.

In the present embodiment, the method for performing correction by using a function, in the case where the correction processing is performed on the exposure signal, by calculating the difference in the exposure signal between the pixel of interest and the adjacent pixel to specify the portion to be corrected is explained. In addition to this method, it may also be possible to directly generate the value of the exposure signal after the correction by, for example, performing pattern matching or using an LUT (Look Up Table).

Further, in the present embodiment, the signal value after the correction is determined by using the calculation expression for the HT image data, but the method may be one for performing replacement processing on the pixel of interest and the adjacent pixel by holding in advance a pattern in which the signal difference between pixels is set to a value smaller than the limit value for each tone level.

Furthermore, in the halftone processing by the dither method of the present embodiment, the exposure intensity of the light-emitting element is controlled by providing the limit value to the signal difference in the exposure scanning direction so that the slope of the distribution of the quantity of light used to finally expose the surface of the photoreceptor by exposure and scan does not exceed the predetermined slope. On the other hand, in the direction perpendicular to the exposure scanning direction, the limit value is not provided to the signal difference because each light-emitting element of the LED element group individually exposes the surface of the photoreceptor. Due to this, it is made possible to form an exposure distribution whose slope is steep, and therefore, it is possible to keep the blurring of dots in the dither pattern to a minimum.

As above, according to the present embodiment, the pixel whose intensity is to be modulated and the intensity of the peripheral pixel are determined for each of the plurality of light-emitting elements and control is performed so that the nonlinearity of the output image density with respect to the exposure intensity is suppressed. Due to this, even in the case where a latent image is formed by the intensity modulation system, it is possible to stably keep the linearity of the density of an output image with respect to the input tone level and to generate an exposure signal capable of stable printing at all times.

Second Embodiment

The first embodiment is the aspect in which the correction processing is performed on the exposure signal of the pixel constituting the HT image data that is generated by the halftone processing. Next, an aspect is explained as a second embodiment, in which the same effects as those of the first embodiment are obtained by devising dither matrix data that is used at the time of performing the multivalued dither processing in the halftone processing unit. Explanation of the portions in common to those of the first embodiment is omitted or simplified and in the following, different points are explained mainly.

Figure 10:
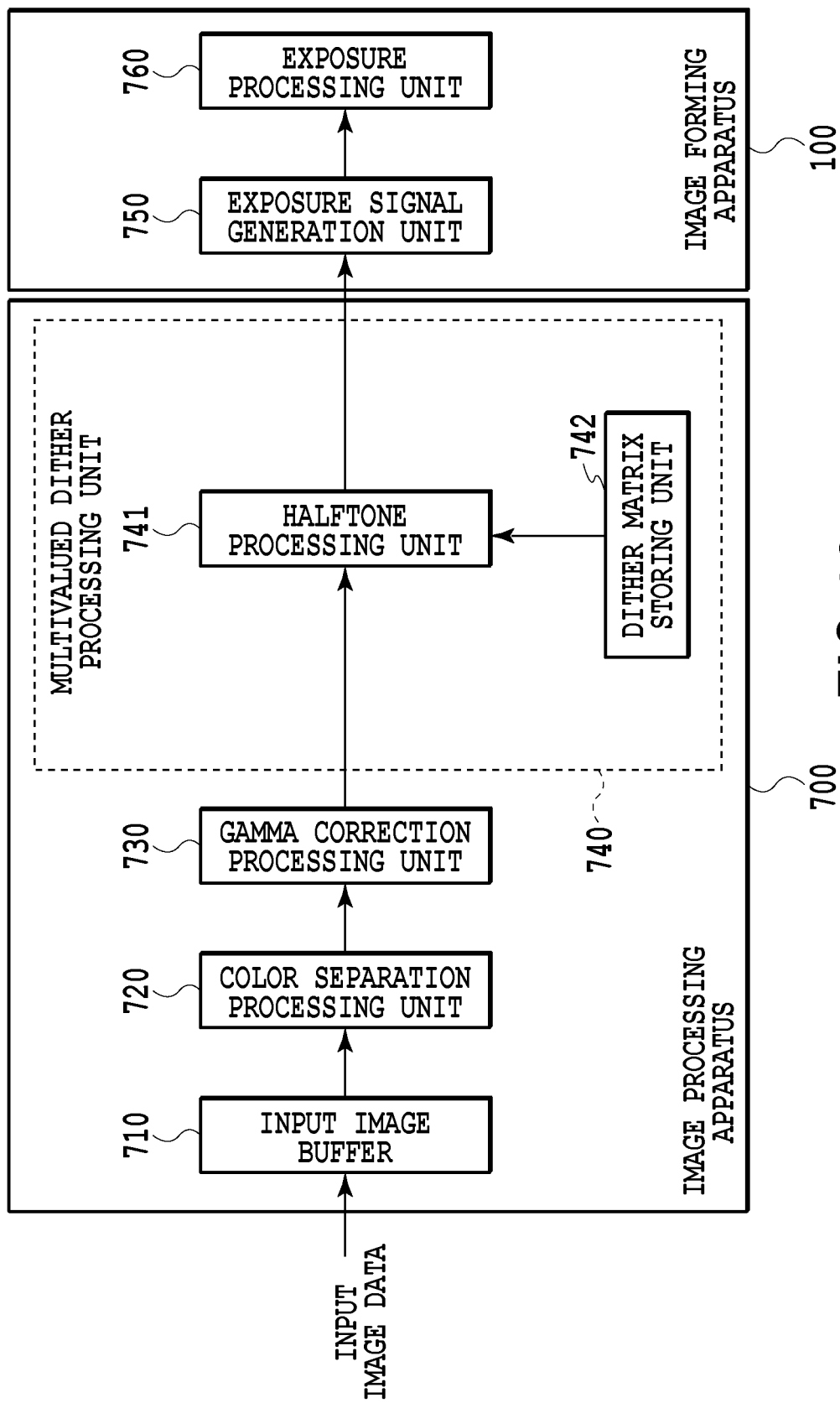
FIG. 10 is a diagram showing an example of a configuration of a printing system according to a second embodiment.

FIG. 10 is a diagram showing an example of a configuration of a printing system according to the present embodiment. Unlike the first embodiment shown in FIG. 7, it is known that the multivalued dither processing unit 740 includes the halftone processing unit 741 and the dither matrix storing unit 742 and the signal difference determination unit 743 and the correction processing unit 744 do not exist. Each component is the same as that explained in FIG. 7, and therefore, explanation is omitted.

[Multivalued Dither Processing]

Subsequently, the multivalued dither processing that is performed in the halftone processing unit 741 of the present embodiment is explained. In the present embodiment, the case where 8-bit (256 tone levels) image data of each of CMYK colors on which the gamma correction has been performed is converted into 4-bit (16 tone levels) HT image data of each of CMYK colors that can be output by the image forming apparatus 100 by the multivalued dither processing is explained as an example. However, the method of the multivalued dither processing for each color is common except in that the dither matrix that is used is different, and therefore, in the following, only the processing for one color is explained.

FIG. 11A shows an example of a dither matrix that is used in the multivalued dither processing in the present embodiment and FIG. 11B shows an example of a threshold value matrix having a group of threshold values associated with each pixel position of the dither matrix. In the present embodiment, a dither matrix 1101 including 16 (4×4) pixels is used. A number attached to each pixel in FIG. 11A indicates the pixel position for association with the group of threshold values in FIG. 11B. The shape of the dither matrix 1101 shown in FIG. 11A is merely an example and the shape is not limited to this. By repeatedly arranging the dither matrix as shown in FIG. 11A in accordance with the size of input image data, it is made possible to perform dither processing on the whole of input image data.

In the case where the tone levels of input image data are converted from 256 tone levels into 16 tone levels as in the present embodiment, with each pixel position of the dither matrix, 15 threshold values are associated. In a threshold value matrix 1102 shown in FIG. 11B, threshold values associated with each pixel position are included. These threshold values are set in a range (0 to 255) that 256 tone levels can take, which are tone level values of the input image data, and the range is divided into 16 intervals in the same number as the number of tone levels that can be output by the image forming apparatus 100. Then, output values are associated with each of the 16 intervals. Here, in the case where the jth threshold value of the demarcation of the interval in the pixel position i of the dither matrix is taken to be Th (i, j), then, a signal value Out of the HT image data for a tone level value In of the input image data will be as follows.

if (In≤Th $(i,1)$), then Out=0 elseif (Th $(i,1)$<In≤Th $(i,2)$), then Out=1 elseif (Th $(i,2)$<In≤Th $(i,3)$), then Out=2 elseif (Th $(i,3)$<In≤Th $(i,4)$), then Out=3 elseif (Th $(i,4)$<In≤Th $(i,5)$), then Out=4 elseif (Th $(i,5)$<In≤Th $(i,6)$), then Out=5 elseif (Th $(i,6)$<In≤Th $(i,7)$), then Out=6 elseif (Th $(i,7)$<In≤Th $(i,8)$), then Out=7 elseif (Th $(i,8)$<In≤Th $(i,9)$), then Out=8 elseif (Th $(i,9)$<In≤Th $(i,10)$), then Out=9 elseif (Th $(i,10)$<In≤Th $(i,11)$), then Out=10 elseif (Th $(i,11)$<In≤Th $(i,12)$), then Out=11 elseif (Th $(i,12)$<In≤Th $(i,13)$), then Out=12 elseif (Th $(i,13)$<In≤Th $(i,14)$), then Out=13 elseif (Th $(i,14)$<In≤Th $(i,15)$), then Out=14 elseif (Th $(i,15)$<In, then Out=15

In the present embodiment, the dither matrix and the threshold value matrix as described above are stored in the dither matrix storing unit 742.

The halftone processing unit 741 compares the signal value of the pixel of interest in the input image data with the threshold value associated with the pixel of the dither matrix corresponding to the pixel of interest and specifies the interval of the 16 intervals described above in which the signal value of the pixel of interest is included. Then, the output value associated with the specified interval is taken to be the signal value in the HT image data.

[Specific Example of Correction Processing]

Figure 12:
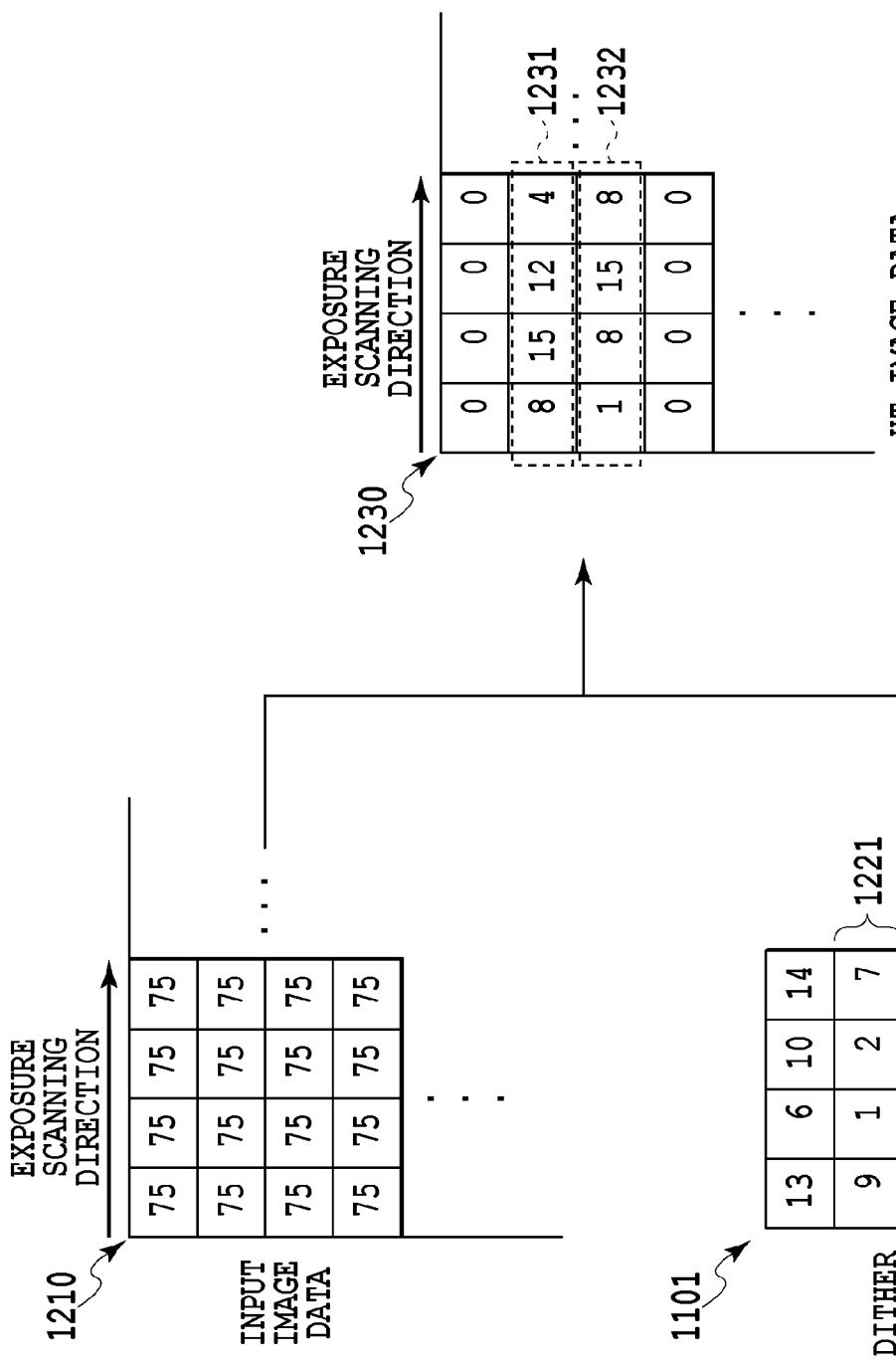
FIG. 12 is a diagram showing an example of the results in the case where halftone processing is performed in the second embodiment.

In the present embodiment, the multivalued dither matrix is designed so that the difference between the value of the exposure signal of the pixel of interest and the value of the exposure signal of the pixel adjacent to the pixel of interest in the exposure scanning direction is equal to or less than the limit value T in the HT image data. FIG. 12 is a diagram showing an example of the results in the case where the halftone processing is performed on input image data 1210 whose tone level is "75" by using the dither matrix 1101 (including the corresponding threshold value matrix 1102) shown in FIGS. 11A and 11B.

In FIG. 12, for example, the output values corresponding to the pixel positions (9, 1, 2, 7) adjacent in the exposure scanning direction of a row 1221 within the dither matrix 1101 are (8, 15, 12, 4), respectively, as shown in a broken line frame 1231. At this time, all the differences between the adjacent output values are equal to or less than the limit value=8. Further, the output values corresponding to the pixel positions (5, 4, 3, 11) adjacent in the exposure scanning direction of a row 1222 within the dither matrix 1101 are (1, 8, 15, 8), respectively, as shown in a broken line frame 1232. As described above, it is known that all the differences between the adjacent output values are equal to or less than the limit value T=8.

In the present embodiment, in the case where the tone level value of the input image data is increased, for example, after the output value at the pixel position "i=1" of the dither matrix reaches the limit value T="8" accompanying an increase in the tone level value of the input image data, an increase in the output values corresponding to the pixel positions "i=2, 9 (both sides adjacent to the pixel position i=1" of the dither matrix is started. Then, before the output values at the pixel positions "i=2, 9" reach the limit value T="8" accompanying an increase in the tone level value of the input image data, an increase in the output value corresponding to the pixel position i=7 (right side adjacent to the pixel position i=2) of the dither matrix is started.

By designing the dither matrix so that the tone level difference in the halftone pixel part is equal or less than a fixed value and by controlling the generation of a dither pattern as described above, it is possible to grow dots in such a manner that the output signal difference between the pixel positions adjacent to each other in the exposure scanning direction does not exceed the limit value T="8" in the case where the tone level value of the input image having at least uniform tone level is increased sequentially.

Due to this, the dither pattern is generated so that the signal difference between pixels is equal to or less than the limit value T in the image having a uniform tone level at least in the exposure scanning direction, and therefore, the variation in the slope at the edge part of the exposure distribution is limited. Because of this, the slop at the edge part of the electrostatic latent image that is formed on the photoreceptor drum 151a is substantially uniform. As a result, even in the case the development potential fluctuates, it is made possible to suppress the fluctuations in the rate of increase of the toner-stuck area in the halftone pixel.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in the case where an image is formed by the system in which the photoreceptor is exposed by the intensity modulation of a light beam, it is possible to stably keep the linearity of the output image density with respect to the input tone level value. Further, it is also possible to generate exposure signal data capable of stable printing at all times.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-009530, filed Jan. 21, 2015 which is hereby incorporated by reference herein in its entirety.

What is claimed is:

1. An image processing apparatus that generates a halftone image to be used in a case where an image is formed on a printing medium by exposing a photoreceptor by intensity modulation of a light beam, the apparatus comprising:
   a multivalued dither processing unit configured to generate an N-nary (N≥3) image from an input image by a dither method;
   a determination unit configured to determine whether a difference in pixel value between pixels adjacent to each other in an exposure scanning direction exceeds a predetermined limit value for each pixel of the N-nary image generated by the multivalued dither processing unit; and
   a correction unit configured to correct the pixel values of the adjacent pixels whose difference in pixel value has been determined to exceed the predetermined limit value so that the difference does not exceed the limit value.

2. The image processing apparatus according to claim 1, wherein
   the correction unit performs correction so that the difference in pixel value does not exceed the limit value by reducing the pixel value of whichever of the adjacent pixels whose difference in pixel value has been determined to exceed the predetermined limit value has a greater pixel value, and increasing the pixel value of the pixel whose pixel value is smaller by an amount about equal to the amount by which the pixel value is reduced.

3. The image processing apparatus according to claim 2, wherein
the correction unit does not perform the correction in a case where the pixel having a greater pixel value of the adjacent pixels whose difference in pixel value has been determined to exceed the predetermined limit value is not in contact in the exposure scanning direction with a pixel whose pixel value is equal to or greater than a predetermined value.

4. The image processing apparatus according to claim 1, wherein
the correction unit does not perform the correction in a case where the pixel having a smaller pixel value of the adjacent pixels whose difference in pixel value has been determined to exceed the predetermined limit value is in contact in the exposure scanning direction with a pixel whose pixel value is equal to or greater than a predetermined value.

5. The image processing apparatus according to claim 1, wherein
the correction unit does not perform the correction in a case where the input image data is image data having an attribute in which priority is given to resolution.

6. The image processing apparatus according to claim 1, wherein
the predetermined limit value is a value that provides an intensity substantially half a maximum intensity in the intensity modulation.

7. An image processing apparatus that generates a halftone image to be used in a case where an image is formed on a printing medium by intensity modulation of a light beam, the apparatus comprising:
a dither matrix storing unit configured to store a dither matrix and a threshold value matrix having a group of threshold values associated for each pixel position of the dither matrix, both matrix being used in halftone processing by a dither method;
a multivalued dither processing unit configured to generate halftone image data having a predetermined number of tone levels by performing the halftone processing by the dither method on an input image;
wherein
the multivalued dither processing unit determines a pixel value of each pixel constituting the halftone image by using the dither matrix and the threshold value matrix that are stored in the dither matrix storing unit; and
the dither matrix is configured so that a difference in pixel value between pixels adjacent to each other in an exposure scanning direction in the halftone image does not exceed a predetermined limit value in a case where the tone level value of the input image data is increased sequentially.

8. An image processing method for generating halftone image data to be used in a case where an image is formed on a printing medium by exposing a photoreceptor by intensity modulation of a light beam, the method comprising the steps of:
generating an N-nary (N≥3) image from an input image by a dither method;
determining whether a difference in pixel value between pixels adjacent to each other in an exposure scanning direction exceeds a predetermined limit value for each pixel of the N-nary image; and
correcting the pixel values of the adjacent pixels whose difference in pixel value has been determined to exceed the predetermined limit value so that the difference does not exceed the limit value.

9. A non-transitory computer readable storage medium storing a program for causing a computer to perform an image processing method for generating halftone image data to be used in a case where an image is formed on a printing medium by exposing a photoreceptor by intensity modulation of a light beam, the method comprising the steps of:
generating an N-nary (N≥3) image from an input image by a dither method;
determining whether a difference in pixel value between pixels adjacent to each other in an exposure scanning direction exceeds a predetermined limit value for each pixel of the N-nary image; and
correcting the pixel values of the adjacent pixels whose difference in pixel value has been determined to exceed the predetermined limit value so that the difference does not exceed the limit value.

* * * * *